(12) United States Patent
Klingensmith et al.

(10) Patent No.: US 12,134,181 B2
(45) Date of Patent: Nov. 5, 2024

(54) ROBOT CHOREOGRAPHER

(71) Applicant: Boston Dynamics, Inc., Waltham, MA (US)

(72) Inventors: Matthew Klingensmith, Waltham, MA (US); Eric Whitman, Waltham, MA (US); Marco da Silva, Arlington, MA (US); Alfred Rizzi, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 18/317,788

(22) Filed: May 15, 2023

(65) Prior Publication Data

US 2023/0286167 A1    Sep. 14, 2023

Related U.S. Application Data

(63) Continuation of application No. 16/600,786, filed on Oct. 14, 2019, now Pat. No. 11,691,292.

(51) Int. Cl.
*B25J 11/00*    (2006.01)
*B25J 9/16*    (2006.01)
*G05D 1/00*    (2006.01)

(52) U.S. Cl.
CPC .......... *B25J 11/0035* (2013.01); *B25J 9/162* (2013.01); *B25J 9/1694* (2013.01); *G05D 1/0212* (2013.01)

(58) Field of Classification Search
CPC .............. G05D 1/0212; B62D 57/032; G05B 2219/40099; G05B 2219/40395
See application file for complete search history.

(56) References Cited

U.S. PATENT DOCUMENTS 9,969,086 B1 *   5/2018   Whitman ............. B62D 57/032
11,691,292 B2    7/2023   Klingensmith et al.
(Continued)

FOREIGN PATENT DOCUMENTS

JP    2003-077587 A    3/2003
JP    2003-340761 A    12/2003

OTHER PUBLICATIONS

International Search Report, PCT US/2020/055220, dated Feb. 9, 2021, 20 pages.
(Continued)

*Primary Examiner* — Khoi H Tran
*Assistant Examiner* — Nhi Q Bui
(74) *Attorney, Agent, or Firm* — Knobbe, Martens, Olson & Bear, LLP

(57) ABSTRACT

The disclosure provides a method for generating a joint command. The method includes receiving a maneuver script including a plurality of maneuvers for a legged robot to perform where each maneuver is associated with a cost. The method further includes identifying that two or more maneuvers of the plurality of maneuvers of the maneuver script occur at the same time instance. The method also includes determining a combined maneuver for the legged robot to perform at the time instance based on the two or more maneuvers and the costs associated with the two or more maneuvers. The method additionally includes generating a joint command to control motion of the legged robot at the time instance where the joint command commands a set of joints of the legged robot. Here, the set of joints correspond to the combined maneuver.

20 Claims, 12 Drawing Sheets

(56) References Cited

U.S. PATENT DOCUMENTS

| | | | |
|---|---|---|---|
| 2005/0125099 A1* | 6/2005 | Mikami | B62D 57/032 |
| | | | 700/245 |
| 2005/0165507 A1 | 7/2005 | Shimizu et al. | |
| 2007/0150105 A1 | 6/2007 | Orita et al. | |
| 2011/0231050 A1 | 9/2011 | Goulding | |
| 2013/0079930 A1 | 3/2013 | Mistry | |
| 2013/0144441 A1* | 6/2013 | Kanazawa | B25J 9/1607 |
| | | | 700/263 |
| 2014/0163736 A1 | 6/2014 | Azizian et al. | |
| 2015/0051734 A1* | 2/2015 | Zheng | B62D 57/032 |
| | | | 901/1 |
| 2017/0080565 A1* | 3/2017 | Dalibard | B25J 9/1694 |

OTHER PUBLICATIONS

Japanese Office Action in Patent Application No. 2022-504698, mailing date Jul. 4, 2023.

\* cited by examiner

ROBOT CHOREOGRAPHER

TECHNICAL FIELD

This disclosure relates to robot choreography.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability to program robots in a quick and an efficient manner for various movement routines provides additional benefits to such industries.

SUMMARY

One aspect of the disclosure provides a method for generating a joint command. The method includes receiving, at data processing hardware, a maneuver script including a plurality of maneuvers for a legged robot to perform. Here, each maneuver is associated with a cost. The method further includes identifying, by the data processing hardware, that two or more maneuvers of the plurality of maneuvers of the maneuver script occur at the same time instance. The method also includes determining, by the data processing hardware, a combined maneuver for the legged robot to perform at the time instance based on the two or more maneuvers and the costs associated with the two or more maneuvers. The method additionally includes generating, by the data processing hardware, a joint command to control motion of the legged robot at the time instance where the joint command commands a set of joints of the legged robot. Here, the set of joints correspond to the combined maneuver.

Implementations of the disclosure may include one or more of the following optional features. In some implementations, the legged robot corresponds to a quadruped robot. In some examples, one of the plurality of maneuvers include a hint where the hint corresponds to a body movement for a body of the legged robot. In these examples, the method may further include determining, by the data processing hardware, whether the hint is compatible with another maneuver of the plurality of maneuvers occurring at a same instance of time as the hint and modifying, by the data processing hardware, the other maneuver to incorporate the body movement of the hint when the hint is compatible with the other maneuver. In some configurations, each maneuver is configured to use an active controller for the legged robot or to modify an active controller for the legged robot, wherein a maneuver that modifies an active controller for the legged robot defines a hint. Optionally, the cost associated with each maneuver includes a user-defined cost indicating an importance for the legged robot to perform the maneuver.

In some examples, at least one of the plurality of maneuvers includes a footstep maneuver where the footstep maneuver includes a location and a time for a touchdown of a swing leg of the legged robot. In some implementations, at least one of the plurality of maneuvers includes an arm maneuver where the arm maneuver includes a pose of a manipulator of the legged robot. In some configurations, the maneuver script includes a dance script and each maneuver includes a dance move. Here, the method may further include synchronizing, by the data processing hardware, each dance move of the dance script with a beat of a song. Additionally or alternatively, the method also may include determining, by the data processing hardware, that an exit state of a first maneuver of the plurality of maneuvers of the maneuver script complies with an entry state of a subsequent maneuver.

Another aspect of the disclosure provides a robot capable of generating a joint command. The robot includes a body, two or more legs coupled to the body, and a computing system in communication with the body and the two or more legs. The computing system includes data processing hardware and memory hardware in communication with the data processing hardware. The memory hardware stores instructions that when executed on the data processing hardware cause the data processing hardware to perform operations. The operations include receiving a maneuver script including a plurality of maneuvers for the robot to perform. Here, each maneuver is associated with a cost. The operations further include identifying that two or more maneuvers of the plurality of maneuvers of the maneuver script occur at the same time instance. The operations also include determining a combined maneuver for the robot to perform at the time instance based on the two or more maneuvers and the costs associated with the two or more maneuvers. The operations additionally include generating a joint command to control motion of the robot at the time instance where the joint command commands a set of joints of the robot. Here, the set of joints correspond to the combined maneuver.

This aspect may include one or more of the following optional features. In some implementations, the legged robot corresponds to a quadruped robot. In some examples, one of the plurality of maneuvers include a hint where the hint corresponds to a body movement for the body of the robot. In these examples, the operations may further include determining whether the hint is compatible with another maneuver of the plurality of maneuvers occurring at a same instance of time as the hint and modifying the other maneuver to incorporate the body movement of the hint when the hint is compatible with the other maneuver. In some configurations, each maneuver is configured to use an active controller for the robot or to modify an active controller for the robot, wherein a maneuver that modifies an active controller for the robot defines a hint. Optionally, the cost associated with each maneuver includes a user-defined cost indicating an importance for the robot to perform the maneuver.

In some examples, at least one of the plurality of maneuvers includes a footstep maneuver where the footstep maneuver includes a location and a time for a touchdown of a swing leg of the robot. In some implementations, at least one of the plurality of maneuvers includes an arm maneuver where the arm maneuver includes a pose of a manipulator of the robot. In some configurations, the maneuver script includes a dance script and each maneuver includes a dance move. Here, the operations may further include synchronizing each dance move of the dance script with a beat of a song. Additionally or alternatively, the operations also may include determining that an exit state of a first maneuver of the plurality of maneuvers of the maneuver script complies with an entry state of a subsequent maneuver.

The details of one or more implementations of the disclosure are set forth in the accompanying drawings and the

DESCRIPTION OF DRAWINGS

Like reference symbols in the various drawings indicate like elements.

DETAILED DESCRIPTION

Often an entity that owns or controls a robot wants to preprogram movement for the robot. For example, the entity wants the robot to perform a repeatable movement routine. Unfortunately, preprogrammed movements may require hardcoding to generate the desired movements. Here, hardcoding refers to someone, such as a programmer, generating or editing a set of instructions written in a computer programming language. Hardcoding is generally time consuming and may lead to bottlenecks such that only a limited number of people (e.g., programmers/coders) may be able to code movements for the robot. Moreover, modifications to coded movements or the debugging of coded movements may lead to lengthy feedback loops to implement a movement routine. Stated differently, robots often lack a means to rapidly author robot behavior. Additionally, a manufacturer of a robot may prevent the ability of hardcoding new robot movements and/or prevent the ability to edit code previously hardcoded for existing robot movements.

Another potential issue with preprogrammed movement is that it may or may not account for the environment about the robot and/or the physics of the robot itself. In other words, someone coding the preprogrammed movements may not realize that there may be other constraints on the robot during the preprogrammed movements. Without accounting for these other constraints, a preprogrammed routine may fail or damage the robot or the environment about the robot during execution. For instance, the coder for the preprogrammed movement routine may not realize that the robot will be carrying an additional twenty-five pound load during the routine or that the routine may occur in a dynamic environment with static or dynamic obstacles. This clearly puts the onus on the entity or the coder to account for all or a majority of conditions that the robot will experience during a movement routine in order to achieve a successful movement routine.

Figure 1A:
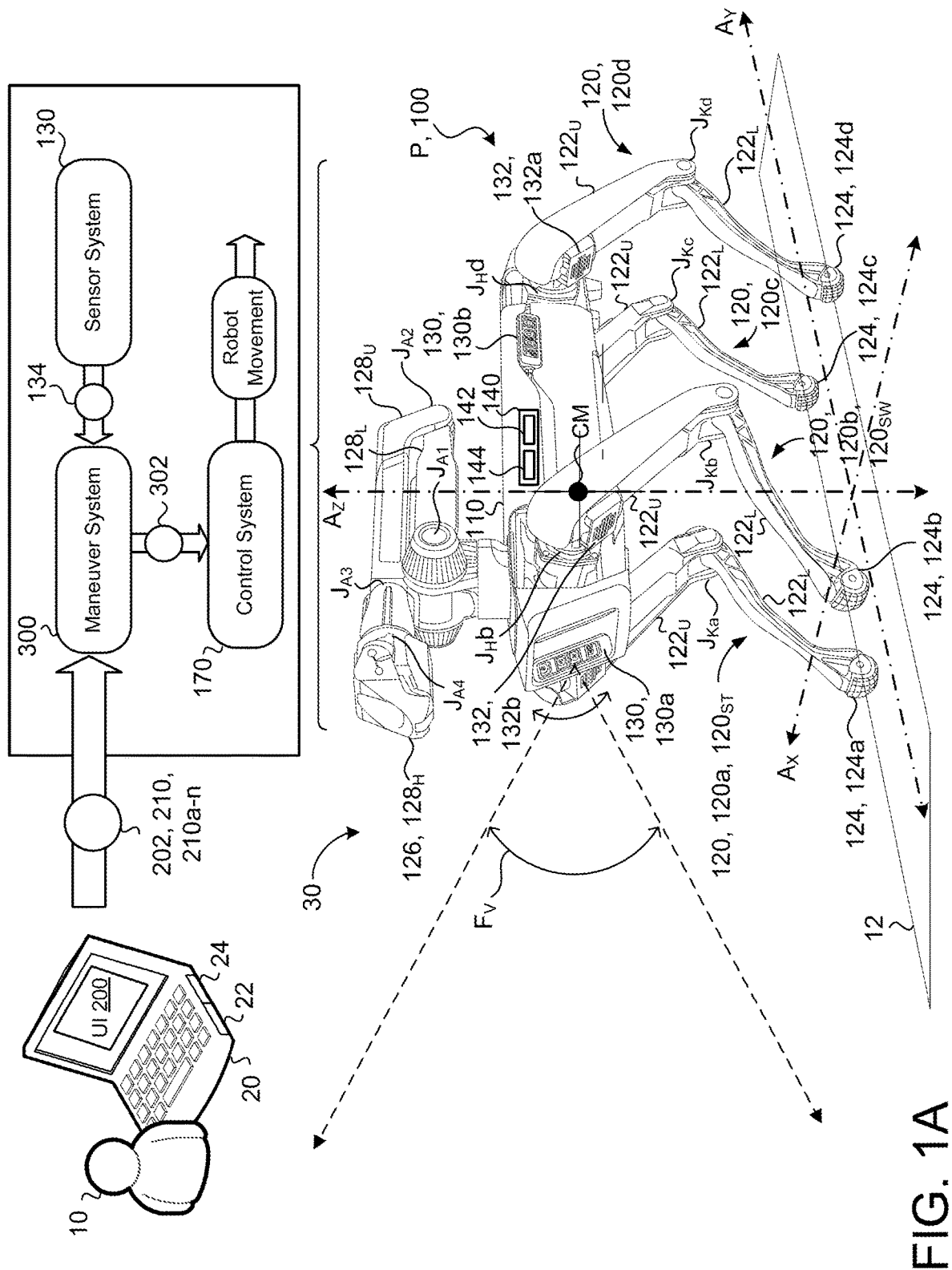
FIG. 1A is a perspective view of an example robot in a robotic environment.

To overcome some of these issues, referring to FIG. 1A, a user 10 designs a movement routine at a user interface (UI) 200 for a robot 100. The robot 100 includes a maneuver system 300 that communicates with the UI 200. Here, the UI 200 enables the user 10 of the robot 100 to generate a movement routine in the form of a maneuver script 202. The maneuver script 202 generally refers to a plurality of maneuvers 210, 210a-n (e.g., that potentially overlap in time) that the user 10 designs at the UI 200 for the robot 100 to perform in a robot environment 30. Here, the UI 200 is capable of building movements for the robot 100 without requiring any new hardcoding. In other words, the user 10 uses the UI 200 to obtain existing maneuvers 210 for the robot 100 that may be layered or combined together to generate the movement routine for the robot 100 in an intuitive and nearly real-time manner. Moreover, some maneuvers 210 of the UI 200 are parameterized such that the user 10 may customize aspects of these maneuvers 210 at the UI 200 to fit his/her desired movement routine. As will become apparent, while maneuvers 210 obtained and selected by the user 10 for the movement routine may themselves be preprogrammed or hardcoded into the robot (e.g., by the manufacturer of the robot 100), the combination and sequence of maneuvers 210 in the maneuver script 202 enable the robot 100 to perform/execute the movement routine without requiring any hardcoding of the movement routine by the user 10.

In some examples, the user 10 runs the UI 200 on a user device 20. Here, the user device 20 executes the UI 200 using computing resources 22, 24 such as data processing hardware 22 and memory hardware 24 in communication with the data processing hardware 22. Some examples for the user device 20 include a mobile device (e.g., a mobile phone, a tablet, a laptop, etc.), a personal computer (PC), a workstation, a terminal, or any other computing device with computing capabilities to execute the UI 200. The UI 200 may be web-based (e.g., a web-based application launched from a web browser), local to the user device 20 (e.g., installed on and/or configured to execute on the computing resources 22, 24 of the user device 20), or some combination of both. In some implementations, the user device 20 uses the UI 200 to communicate the maneuver script 202 to the robot 100 using a wired or a wireless connection. For instance, the UI 200 communicates the maneuver script 202 to the robot 100 over a network (e.g., the network 150 shown in FIG. 1B).

With continued reference to FIG. 1A, the robot 100 includes a body 110 with locomotion based structures such as legs 120a-d coupled to the body 110 that enable the robot 100 to move about the environment 30. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. Although FIG. 1A depicts a quadruped robot with four legs 120a-d, the robot 100 may include any number of legs or locomotive based structures (e.g., a biped or humanoid robot with two legs) that provide a means to traverse the terrain within the environment 30.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint JA such that the distal end 124 is articulable with respect to the lower member $122_L$ of the leg 120.

In some examples, the robot 100 includes an arm 126 that functions as a robotic manipulator. The arm 126 may be configured to move about multiple degrees of freedom in order to engage elements of the environment 30 (e.g., objects within the environment 30) or to perform gestures (e.g., aesthetic gestures). In some examples, the arm 126 includes one or more members 128 where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$. Here, the lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, the hand member $128_H$ includes additional members to enable different types of grasping. These additional members may range from a simple two member claw-like hand member $128_H$ to a more complicated hand member $128_H$ that simulates the digits of a human hand. In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 12 where distal ends 124 of the legs 120 of the robot 100 may generate traction to help the robot 100 move about the environment 30. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_z$.

When a legged-robot moves about the environment 30, each leg 120 of the robot 100 may either be in contact with the ground surface 12 or not in contact with the ground surface 12. When a leg 120 is in contact with the ground surface 12, the leg 120 is referred to as a stance leg $120_{ST}$. When a leg 120 is not in contact with the ground surface 12, the leg 120 is referred to as a swing leg $120_{SW}$. A leg 120 transitions from a stance leg $120_{ST}$ to a swing leg $120_{SW}$ when the leg 120 lifts-off (LO) from the ground surface 12. Conversely, a swing leg $120_{SW}$ may also transition to a stance leg $120_{ST}$ when the swing leg touches down (TD) against the ground surface 12 after not being in contact with the ground surface 12. Here, while a leg 120 is functioning as a swing leg $120_{SW}$, another leg 120 of the robot 100 may be functioning as a stance leg $120_{ST}$ (e.g., to maintain balance for the robot 100).

In order to maneuver about the environment 30, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of vision/image sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

When surveying a field of view $F_V$ with a sensor 132, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor 132. Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) 132 coupled to a joint J. In some examples, these sensors 132 couple to a motor M that operates a joint J of the robot 100 (e.g., sensors 132, 132a-b). Here, these sensors 132 generate joint dynamics in the form of joint-based sensor data 134. Joint dynamics collected as joint-based sensor data 134 may include joint angles (e.g., an upper member $122_U$ relative to a lower member $122_L$), joint speed (e.g., joint angular velocity or joint angular acceleration), and/or forces experienced at a joint J (also referred to as joint forces). Here, joint-based sensor data 134 generated by one or more sensors 132 may be raw sensor data, data that is further processed to form different types of joint dynamics $134_{JD}$, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 is configured to store, to process, and/or to communicate the sensor data 134 to various systems of the robot 100 (e.g., the control system 170 and/or the maneuver system 300). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some examples, the computing system 140 is configured to utilize the remote resources 162, 164 as extensions of the computing resources 142, 144 such that resources of the computing system 140 may reside on resources of the remote system 160. In some configurations, the remote system 160 and/or the computing system 140 hosts the UI 200 such that the user 10 accesses the UI 200 via the network 150 using a web browser application.

Figure 1B:
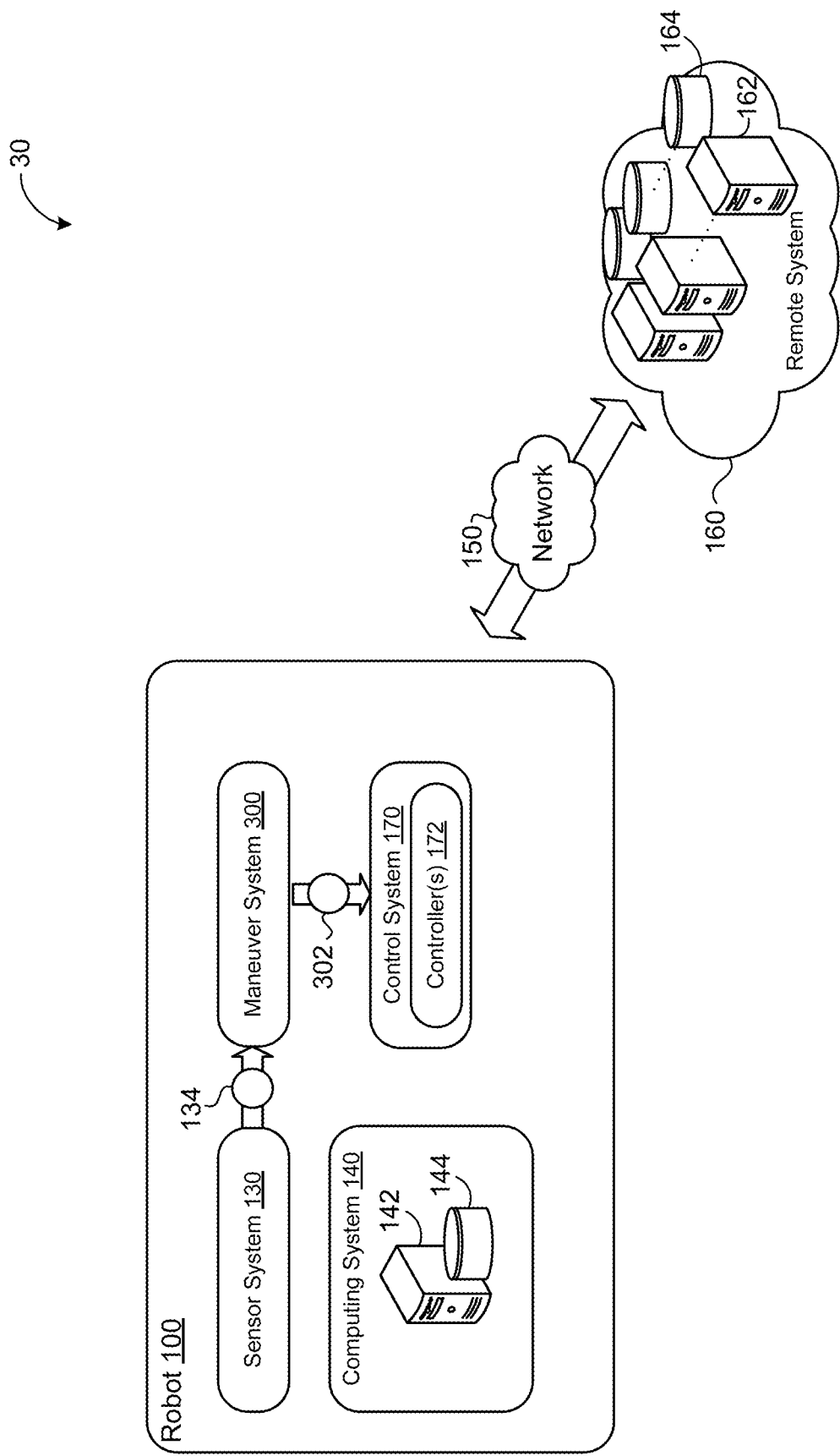
FIGS. 1B and 1C are schematic views of example systems of the robot of FIG. 1A.
Figure 1C:
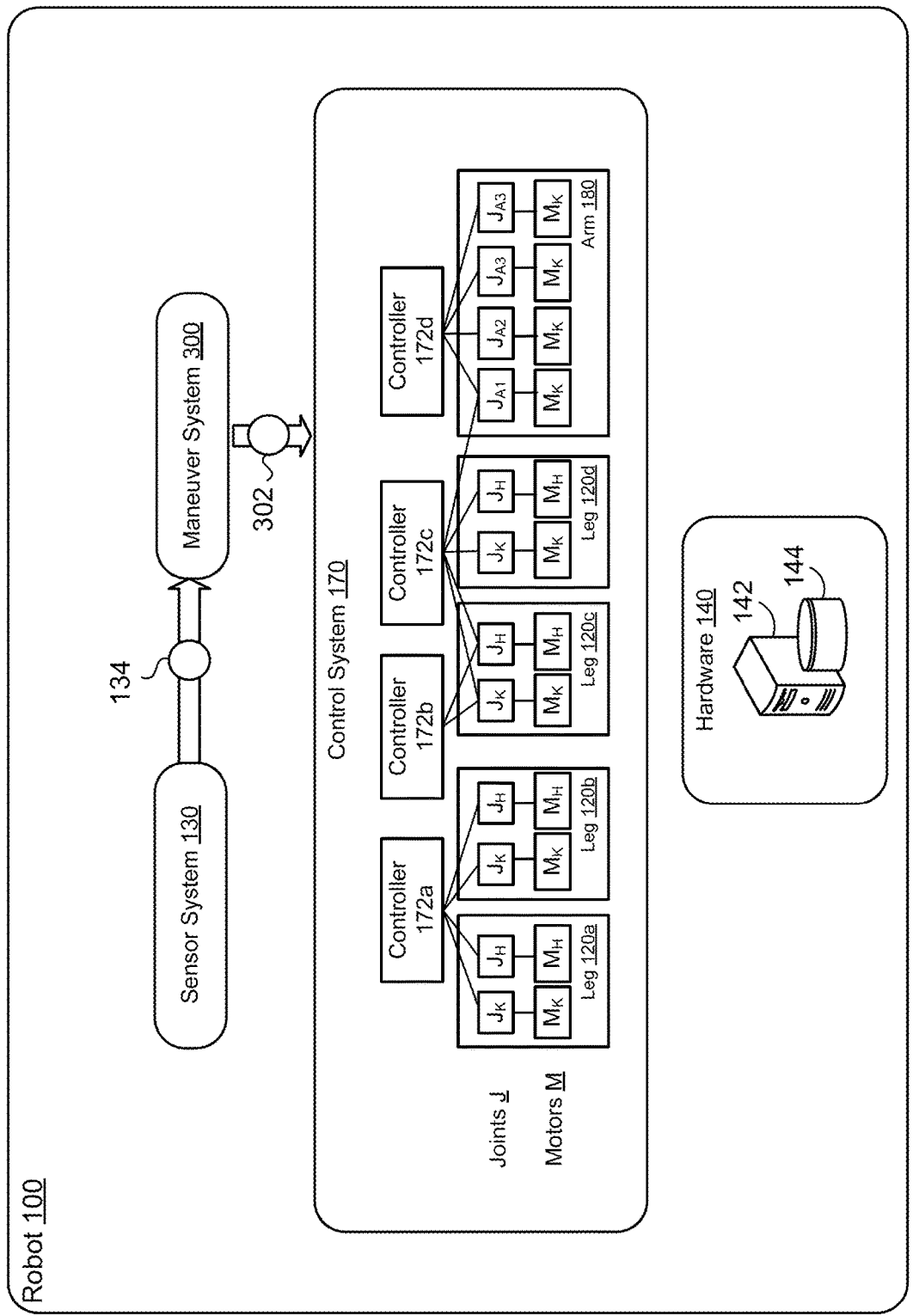

In some implementations, as shown in FIGS. 1A-1C, the robot 100 includes a control system 170. The control system 170 may be configured to communicate with systems of the robot 100 such as the at least one sensor system 130 and/or the maneuver system 300. The control system 170 may perform operations and other functions using hardware 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130, the control system 170, and/or the maneuver system 300). In some implementations, the controller 172 controls movement between poses and/or behaviors of the robot 100.

In some examples, a controller 172 controls the robot 100 by controlling movement about one or more joints J of the robot 100. In some configurations, a controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J) or control multiple joints J of the robot 100. When controlling multiple joints J, the controller 172 may apply the same or different torques to each joint J controlled by the controller 172. By controlling multiple joints J, a controller 172 may coordinate movement for a larger structure of the robot 100 (e.g., the body 110, one or more legs 120, the arm 126). In other words, for some maneuvers 210, a controller 172 may be configured to control movement of multiple parts of the robot 100 such as, for example, two legs 120a-b, four legs 120a-d, or two legs 120a-b combined with the arm 126. For instance, FIG. 1C depicts an example relationship between motors M of the robot 100 and the joints J that these motors M control for a given structure of the robot 100. Here, FIG. 1C illustrates four controllers 172, 172a-d that are setup to control portions of the robot 100. A first controller 172, 172a controls motors M for knee joints $J_K$ and hip joints $J_H$ related to a first leg 120, 120a and a second leg 120, 120b. A second controller 172b is shown configured to control motors M for a knee joint $J_K$ and a hip joint $J_H$ related to a single leg, such as a third leg 120, 120c. A third controller 172c is shown configured to control motors M related to the third leg 120c, a fourth leg 120, 120d, and one of the motors M associated with an arm joint $J_{A1}$. A fourth controller 172d is shown configured to control motors M related to only the arm 126 of the robot 100. For practical comparison, the third controller 172c may allow the robot 100 to lean to side of the robot's body 110 over the third leg 120c and the fourth leg 120d while also grasping something with the arm 180. In contrast to the third controller 172c, the robot 100 may perform a lean and grasp function with three controllers 172 where two controllers 172 individually control the third and fourth leg 120c—d while a fourth controller 172d controls the arm 126. There may be some advantages or reasons to coordinate multiple controllers 172 (e.g., for fine motor control) or to use a single controller 172 (e.g., for simplicity).

Referring to FIGS. 2A-2F, the UI 200 is configured to allow the user 10 to construct a movement routine in the form of a maneuver script 202. In some examples, the maneuver script 202 is a computer-readable format that the user 10 (e.g., via the UI 200) communicates to the robot 100 to enable the robot 100 to perform the movement routine. In some implementations, the maneuver script 202 is a sequence of movements over a set period of time t that the user 10 requests the robot 100 to perform. To construct the maneuver script 202, the UI 200 provides a plurality of maneuvers 210a-n for the user 10 to select. Here, the maneuvers 210 refer to hardcoded movements for the robot 100 coordinated by controllers 172 of the control system 170. A maneuver 210 may correspond to a controller 172 of the robot 100 (e.g., an active controller programmed for the control system 170), a modification to a controller 172 of the robot 100, one or more input parameters 214 for a controller 172 of the robot 100, or any combination thereof. In some examples, the maneuver 210 defines a set of joints J necessary to perform the underlying movement(s) associated with the maneuver 210 (e.g., by designating a controller 172 that controls a specific joint J or joints J). Some different types of maneuvers 210 include the following: footstep maneuvers 210, $210_f$ (or leg maneuvers) that move the feet 124 of the robot 100; arm maneuvers 210, $210_a$ that move the arm 126 of the robot 100; and/or body maneuvers 210, $210_b$ that move the body 110 of the robot 100. Moreover, since a maneuver 210 may correspond to a controller 172, the movement of the maneuver 210 may correspond to any number of joints J, even joints J from different portions of the robot 100 (e.g., from two legs 120 on different sides of the robot's body 110). In other words, a maneuver 210 may be configured to be a hybrid of different types of maneuvers. For example, a maneuver 210 that combines a footstep maneuver $210_f$ and an arm maneuver $210_a$. In some configurations, a maneuver 210 is parameterized such that the maneuver 210 has been hardcoded with parameters 214 that may be modified to generate a set amount of customizable variance in the movement. For instance, a footstep maneuver $210_f$ includes parameters 214 such as designating which foot 124 to step with, a coordinate/position for the footstep (e.g., a LO/TD position), a swing height for the designated stepping foot 124, and/or a step velocity for the designated stepping foot 124. In the case of a body maneuver $210_b$, the parameters 214 may include a sway area, a location to sway around, a direction to sway, a sway speed, and/or a sway style.

In some examples, in order to sequence one or more maneuvers 210 to form a maneuver script 202, the UI 200 divides both the maneuvers 210 and the maneuver script 202 into segments of time called slices $t_S$. In other words, a slice $t_S$ of time from a maneuver 210 is compatible with a slice $t_S$ of time of the maneuver script 202 such that a maneuver 210 may occupy one or more slices $t_S$ of the maneuver script 202. By subdividing a maneuver script 202 into units, such as slices $t_S$, the maneuver script 202 may be scalable to different lengths of time. Stated differently, the UI 200 divides a maneuver script 202 into a number of discrete maneuvers 210 over time where each maneuver 210 corresponds to a fixed number of slices $t_S$. For example, a script builder 222 for building the maneuver script 202 in FIG. 2A in a timeline 222 shows the maneuver script 202 having four maneuvers 210, 210a-d and lasting a total of forty slices $t_S$. Here, a first maneuver 210a occupies twelve slices $t_S$, a second maneuver 210b and a third maneuver 210c occupy eight slices $t_S$ each, and a fourth maneuver 210d occupies twelve slices $t_S$. When the user 10 wants to perform this forty-slice maneuver script 202 in forty seconds, the robot 100 allocates twelve seconds to each of the first maneuver 210a and the fourth maneuver 210d and eight seconds to each of the second maneuver 210c and the third maneuver 210d. In contrast, when the user 10 wants to perform this forty-slice maneuver 202 in twice the time of eighty seconds, the robot 100 scales the slices of the maneuvers 210 such that the robot 100 allocates twenty-four seconds to each of the first maneuver 210a and the fourth maneuver 210d and sixteen seconds to each of the second maneuver 210c and the third maneuver 210d. Additionally or alternatively, since each maneuver 210 also occurs for a set period of time $t_M$ with a start time and an end time, a maneuver script 202 may include unoccupied slices before, between, or after maneuvers 210 as part of the movement routine.

In some implementations, the UI 200 includes a list 212 of maneuvers 210 from which the user 10 may select to build a maneuver script 202. When the user 10 selects from the list 212 (e.g., the selection shown as a bolded outline around a maneuver 210 in FIG. 2B), the selection of the maneuver 210 may display parameters 214 specific to the maneuver 210 that the user 10 may customize (e.g., shown in a simulator 230). In some examples, the user 10 adds the maneuver 210 to the maneuver script 202 by selection or by selecting and dragging the maneuver 210 into the script builder 220. Some examples of a selection include double-clicking or selecting the maneuver 210 and clicking a GUI element, such as "Add," (e.g., as shown in FIG. 2B). Here, the script builder 220 may be another panel within the same window with the maneuver list 212 or a separate window.

When a maneuver 210 is added to the script builder 220 to construct the maneuver script 202, the maneuver 210 may have a default size (e.g., number of slices) based on the hardcoding of the maneuver 210. For instance, a single maneuver 210 that corresponds to a simple movement may, by default, occupy less slices is than a more complicated movement (e.g., a handstand). In either case, the default number of slices is for the maneuver 210 may correspond to a minimum amount of time that the robot 100 needs to successfully perform the maneuver 210. In some implementations, with the maneuver 210 added to the script builder 220, the maneuver 210 may then be further modified. For example, the user 10 resizes the maneuver 210 to extend the maneuver 210 over a number of slices is greater than the default number of slices is for a maneuver 210. In some examples, the script builder 220 is a panel or window that includes a timeline 222 divided into segments (e.g., slices $t_s$). Here, the user 10 imports maneuver(s) 210 into the timeline 222 (e.g., by selection or a drag and drop process) at a slice position within the timeline 222 that the user 10 designates.

Figure 2A:
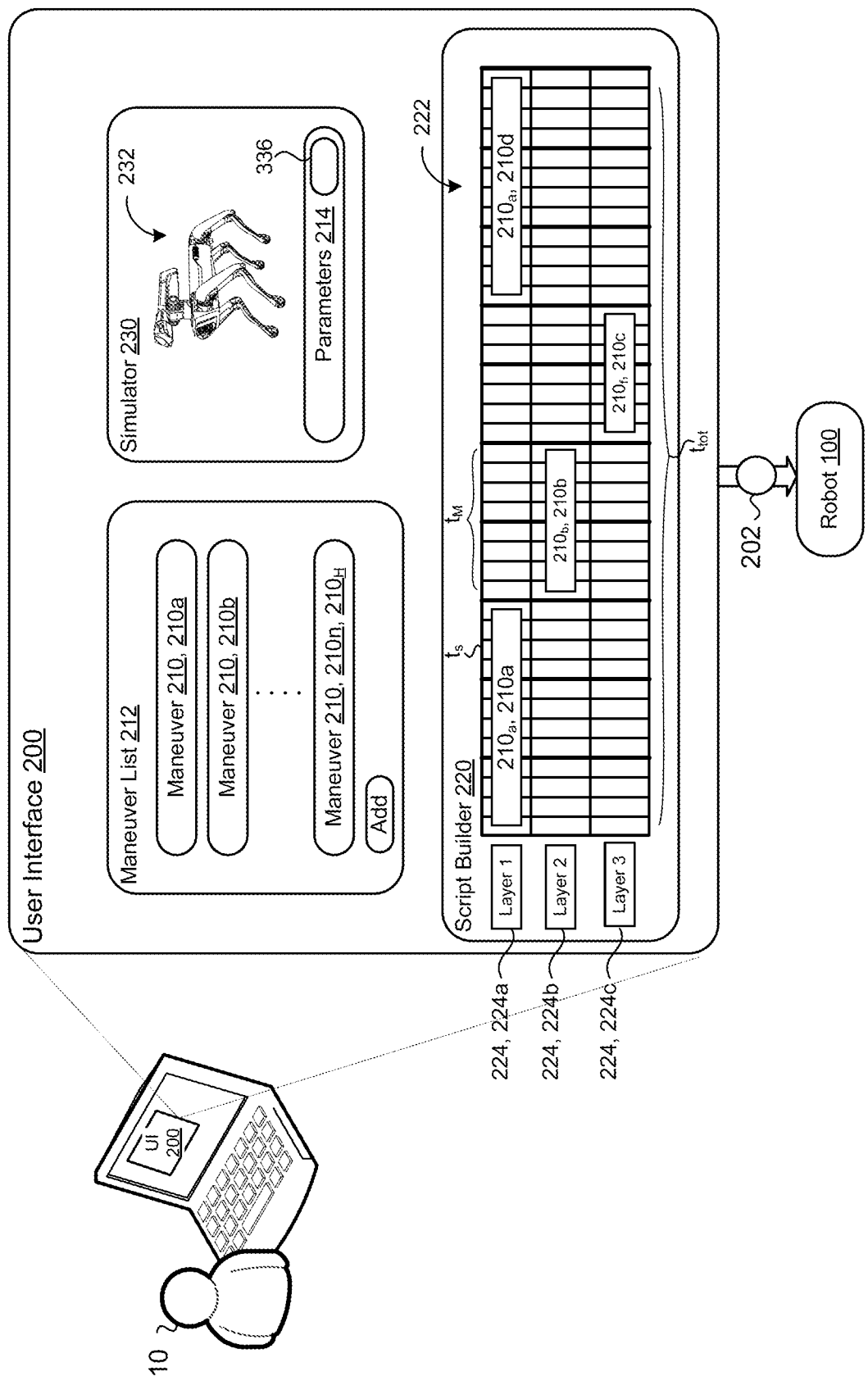
FIGS. 2A-2F are schematic views of example user interfaces that interact with the robot of FIG. 1A.
Figure 2B:
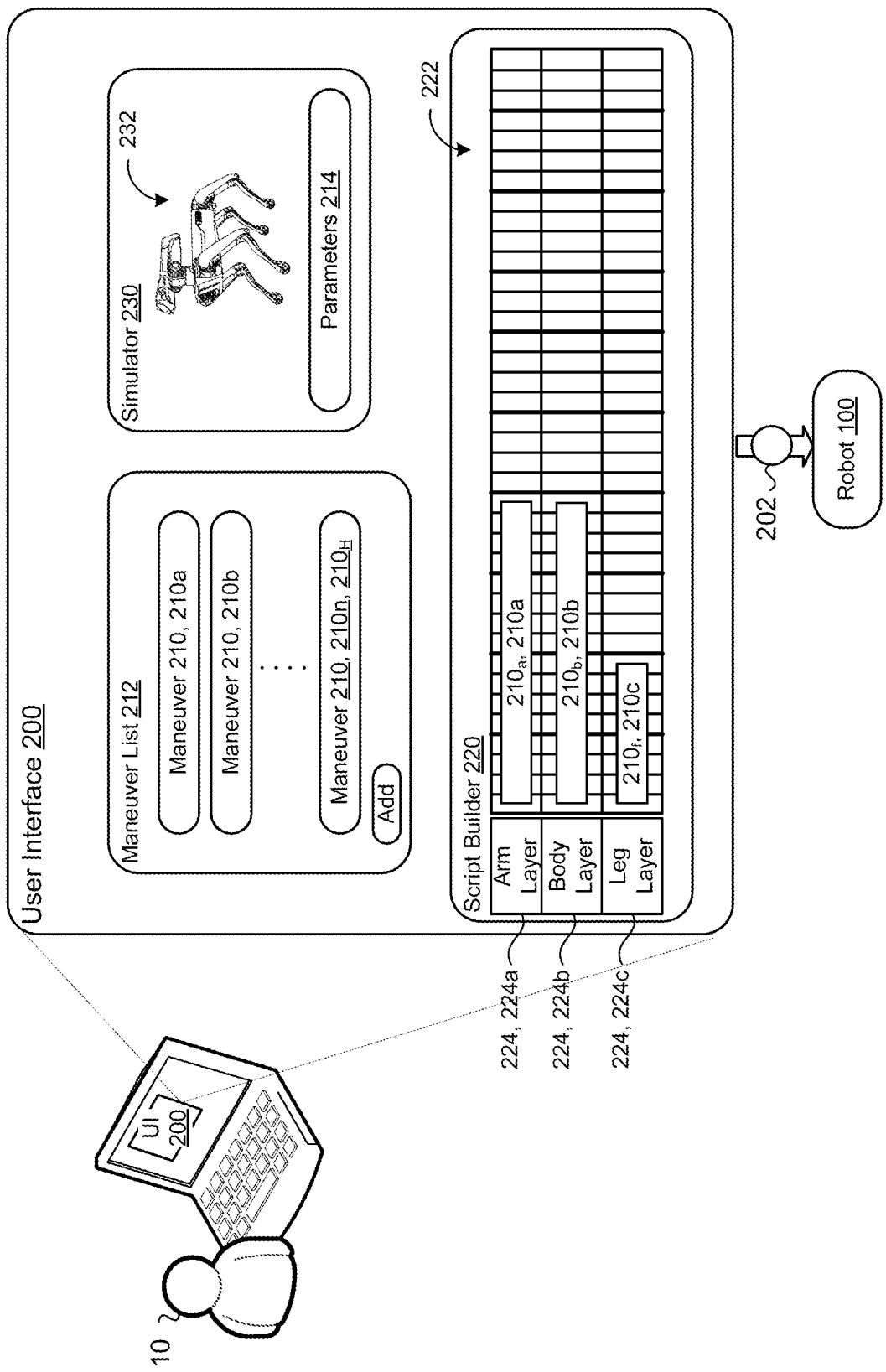

In some examples, such as FIG. 2A, the timeline 222 includes more than one layer 224. Here, a layer 224 refers to a space in the timeline 222 that a maneuver 210 may occupy when it impacts particular joints J allocated to the layer 224. In other words, a layer 224 defines the allocation of joints J for the robot 100. In some configurations, each joint J of the robot 100 is allocated to a particular layer 224 of the timeline 222. For instance, a first layer 224, 224a corresponds to leg joints such as a knee joint $J_K$ and a hip joint hi. In some examples, one or more layers 224 do not have any joints J. An example of a layer 224 without any joints J may be when the layer 224 corresponds to a specific type of maneuver 210, such as a body maneuver $210_b$. In other words, there may be certain maneuvers 210 that passively control joints J. Stated differently, when a maneuver 210 is a modification to a controller 172 or an input to a controller 172, the maneuver 210 may impact a joint J that is already designated or allocated to a particular layer 224. For example, practically speaking, movement of the body 110 occurs by making a change to at least one joint J of at least one leg 120 of the robot 100. Yet, when the joints J of the leg 120 are already allocated to a layer 224 (e.g., for footstep maneuvers $210_f$ or leg maneuvers), a movement of the body 110 may cause joint control interference between two layers 224. In some examples, to prevent issues caused by joint interference, the UI 200 may communicate a body maneuver $210_b$ as a suggested modification to a controller 172 of another layer 224 or a parameter of movement for a particular controller 172. In other words, a body maneuver $210_b$ is a secondary consideration that may impact joint control when it would not interfere with, for example, a leg maneuver. Here, a maneuver 210 that may modify control for a joint J is referred to as a hint $210_H$. When a hint $210_H$ occurs at a particular time instance, the hint $210_H$ is considered by each other active controller 172 (e.g., each time-current controller 172). When a controller 172 interprets the hint $210_H$, the controller 172 may determine that the hint $210_H$ corresponds to joints J different from joints J that the controller 172 controls and ignore modifying its controller behavior for the hint $210_H$. When the hint $210_H$ corresponds to the same joints J, the controller 172 may incorporate the movement or movement parameters 214 of the hint $210_H$ into its own behavior.

In some examples, such as FIG. 2B, the script builder 220 of the UI 200 allows a user 10 to have a maneuver 210 on each layer 224 (e.g., shown as three layers 224, 224a-c) at each instance in time. When joints J are allocated to layers 224 to prevent interference, multiple maneuvers 210 may be layered at the same time instance on the timeline 222. In other words, with layers 224, when a maneuver 210 controls only certain parts of the robot 100, multiple maneuvers 210 may be layered on top of each other to engage a wider range of dynamics for the robot 100. For instance, the designation of a hint $210_H$ allows multiple maneuvers 210 to be layered at the same time instance on the timeline 222 because one layer 224 will be a primary consideration for control (e.g., a leg maneuver) while another layer 224, such as a layer 224, 224b for body maneuvers 210b will be a secondary consideration for control. By having layers 224, maneuvers 210 may be combined and/or sequenced in various combinations to give the user 10 many more options than simply the number of maneuvers 210 available on the list 212. For example, FIG. 2B shows a first maneuver $210_a$, 210a on a first layer 224a (e.g., an arm maneuver layer), a second maneuver $210_b$, 210b on a second layer 224b (e.g., a body maneuver layer), and a third maneuver $210_f$, 210c on a third layer 224c (e.g., a leg maneuver layer).

Figure 2C:
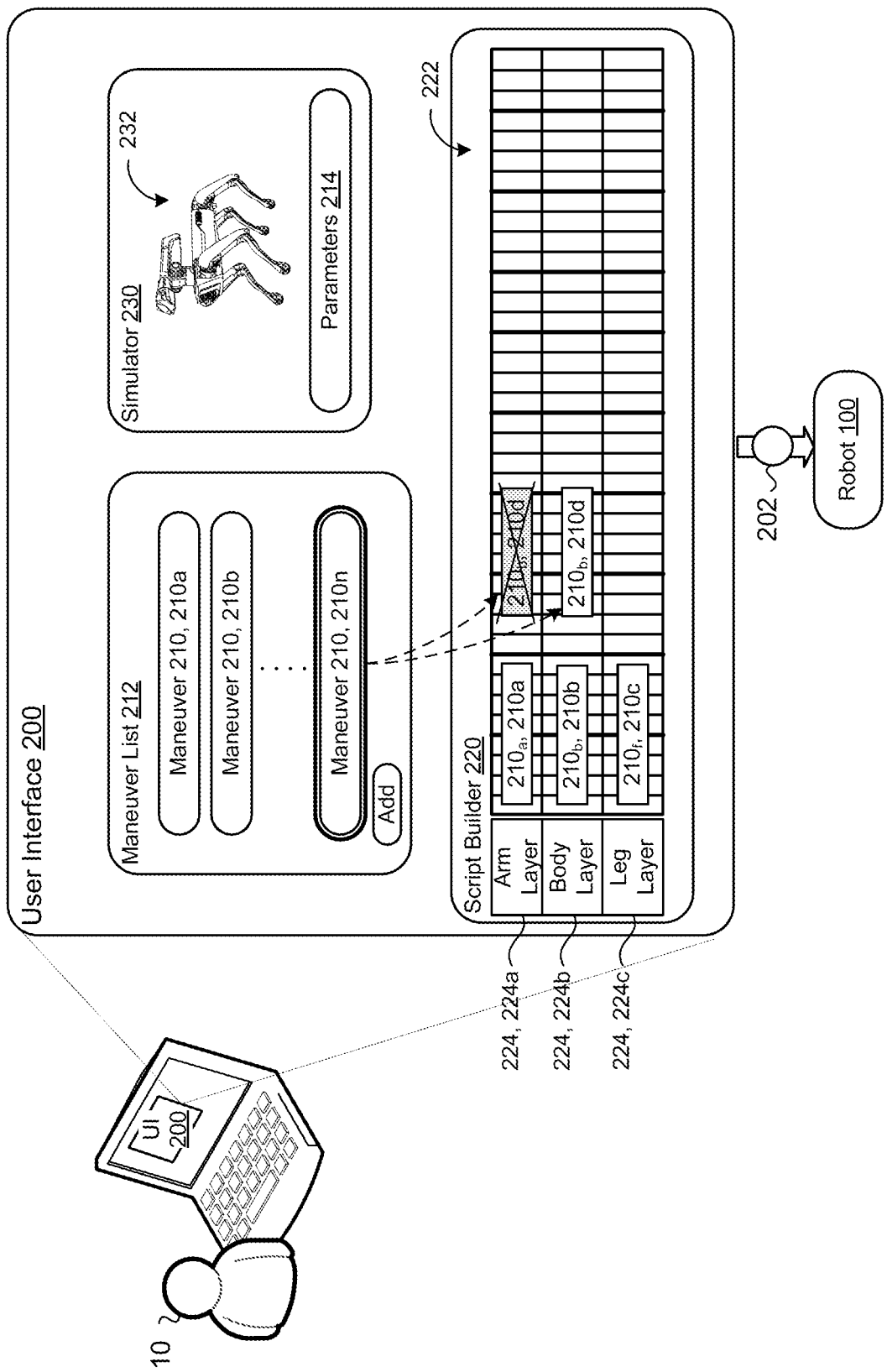

Although the UI 200 allows a layered construction of maneuvers 210, the UI 200 generally does not determine the feasibility of the combination of maneuvers 210. Rather, as long as the layering of maneuvers 210 does not violate rules at the UI 200 (e.g., at the script builder 220), the UI 200 communicates the maneuver script 202 with the combination of the layers 224 to the robot 100 (e.g., to the maneuver system 300 of the robot 100). In some examples, a maneuver 210 is dedicated to a particular layer 224. More particularly, the UI 200 would not allow the user 10 to place a body maneuver $210_b$ on a layer 224 that does not control joints J related to the body maneuver $210_b$. For example, as illustrated by FIG. 2C, the user 10 cannot place a sway body maneuver $210_b$ that impacts joints J of one or more legs 120 on a layer 224 that only controls arm joints JA. In some implementations, when the user 10 adds a maneuver 210 to the timeline 222 of the script builder 220, the maneuver 210 auto-populates to the layer(s) 224 associated with joints J that the maneuver 210 impacts (e.g., needs to control for the underlying movement of the maneuver 210). Here, a user 10 controls where on the timeline 222 the maneuver 210 is positioned, but not the layer 224 itself.

Figure 2D:
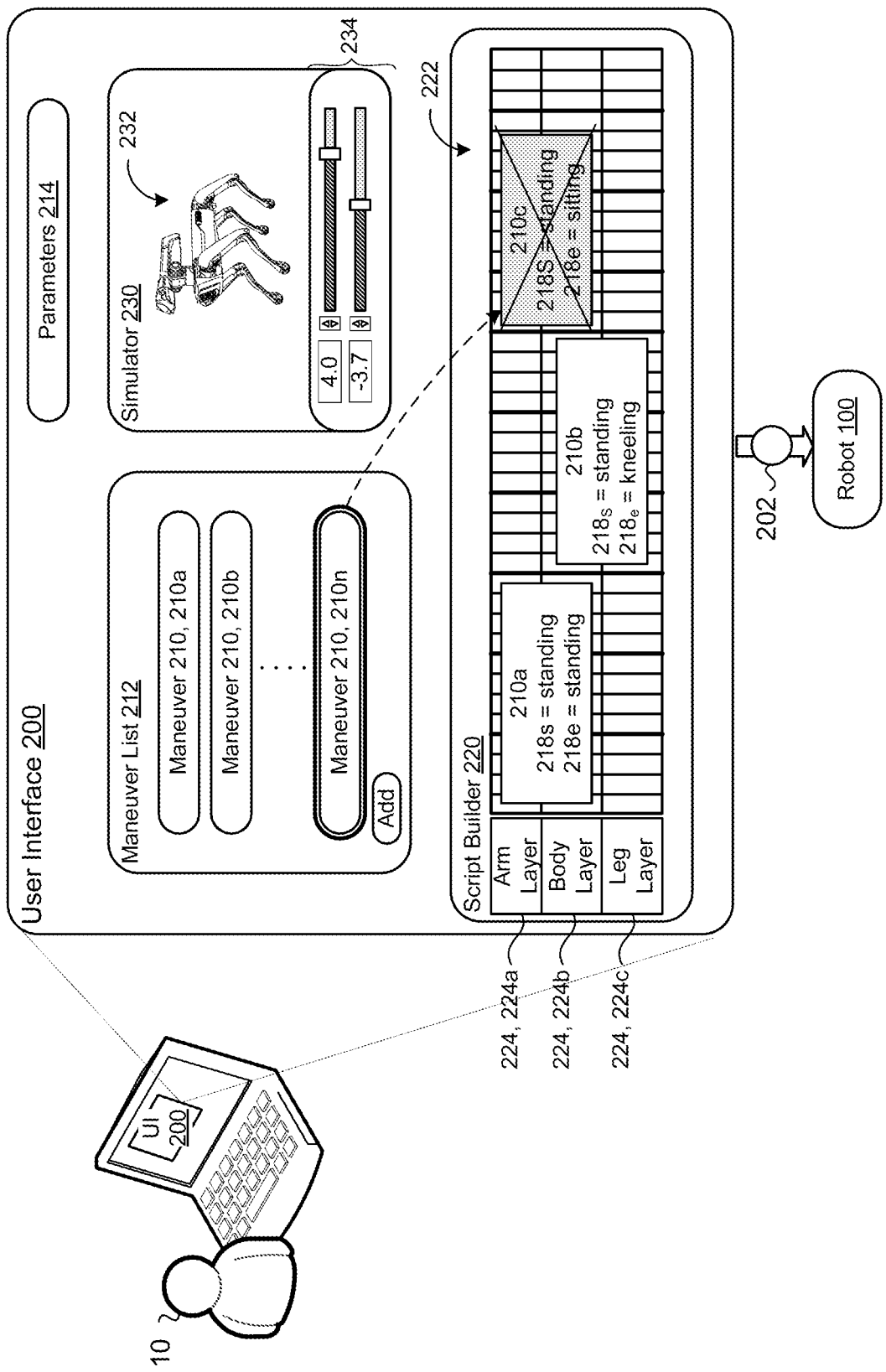

In some configurations, a maneuver 210 is configured to operate joints J on more than one layer 224 of the timeline 222. In these configurations, the script builder 220 includes the maneuver 210 on multiple layers 224 occupying slices is of each layer 224 corresponding to the default number of slices is for the maneuver 210. For instance, FIG. 2D shows a second maneuver 210b on the timeline 222 of the script builder 220 occupying twelve slices is of a second layer 224, 224b and a twelve slices is of a third layer 224, 224c at the same time. Here, the maneuver 210 is shown as a single block such that UI 200 prevents the user 10 from manipulating the same maneuver 210 differently in different layers 224, which would likely cause an error when the robot 100 attempts to perform the maneuver 210. Referring to FIG. 2D, since the timeline 222 includes three layer 224a-c, another maneuver 210 may be combined with the second maneuver 210b by occupying the first layer 224a at some portion of the same time instance.

In some configurations, the UI 200 includes rules regarding a starting state (i.e., an entry state 218s) and ending state (i.e., an exit state 218e) for maneuvers 210. The UI 200 incorporates these rules to prevent a likely error when the robot 100 attempts the maneuver script 202. For example, as illustrated in FIG. 2D, when a second maneuver 210, 210b ends with an ending state 218e of the robot 100 on its knees, the following maneuver 210 (e.g., shown as a third maneuver 210c) cannot assume that the robot 100 is immediately capable of making a maneuver 210 predicated on a starting state 218s that the robot 100 is standing (e.g., certain types of footstep maneuvers 210f).

To overcome these potential issues between neighboring maneuvers 210, each maneuver 210 may include an entry state 218s and/or an exit state 218e. With each maneuver 210 including an entry state 218s and/or exit state 218e, the UI 200 (e.g., the script builder 220) may compare the transitioning states between two neighboring maneuvers 210 (e.g., an exit state 218e of a first maneuver 210a and an entry state 218s of an adjacent second maneuver 210b) to determine whether these transitioning states are compatible. When these transitioning states are not compatible, the UI 200 communicates to the user 10 that the sequence of maneuvers 210 is incompatible. In some examples, the UI 200 recognizes that a particular exit state 218e may be compatible with more than one entry state 218s.

Alternatively, the UI 200 may make this determination when the user 10 is attempting to place or to select an adjacent maneuver 210. Here, when the adjacent maneuver 210 is not compatible, the UI 200 does not allow the user 10 to make the placement or the selection of the maneuver 210. In the example depicted by FIG. 2D, the selected maneuver 210c that is incompatible is greyed out and shown with an "X" to communicate to the user 10 that the maneuver 210 is not compatible at that location in the timeline 222. In some implementations, the UI 200 displays a message at the UI 200 that communicates that maneuver 210 is not compatible for the location where the user wants to place the maneuver 210 on the timeline 222. In some examples, the list 212 is dynamic such that the list 212 displays maneuvers 210 that are compatible with a previous selection. For example, the user 10 may select (i.e., click-on) a maneuver 210 placed on the timeline 222 and the maneuver list 212 displays compatible maneuvers 210. In some examples, the UI 200 includes a GUI element (e.g., from a menu or toolbar in the UI 200) that that the user 10 selects to display compatible maneuvers 210 based on entry state 218s and/or exit state 218e. Additionally or alternatively, the UI 200 may provide assistance to the user 10 when the user 10 selects or tries to place a maneuver 210 at incompatible position on the timeline 222. For instance, the UI 200 may suggest that the user 10 adds a maneuver 210 as a transition between the maneuvers 210 that are incompatible when adjacent to each other in time on the timeline 222. Here, the UI 200 suggests a maneuver 210 that matches the exit state $218_e$ of the first maneuver 210a with the entry state $218_s$ of the second maneuver 210b.

Figure 2E:
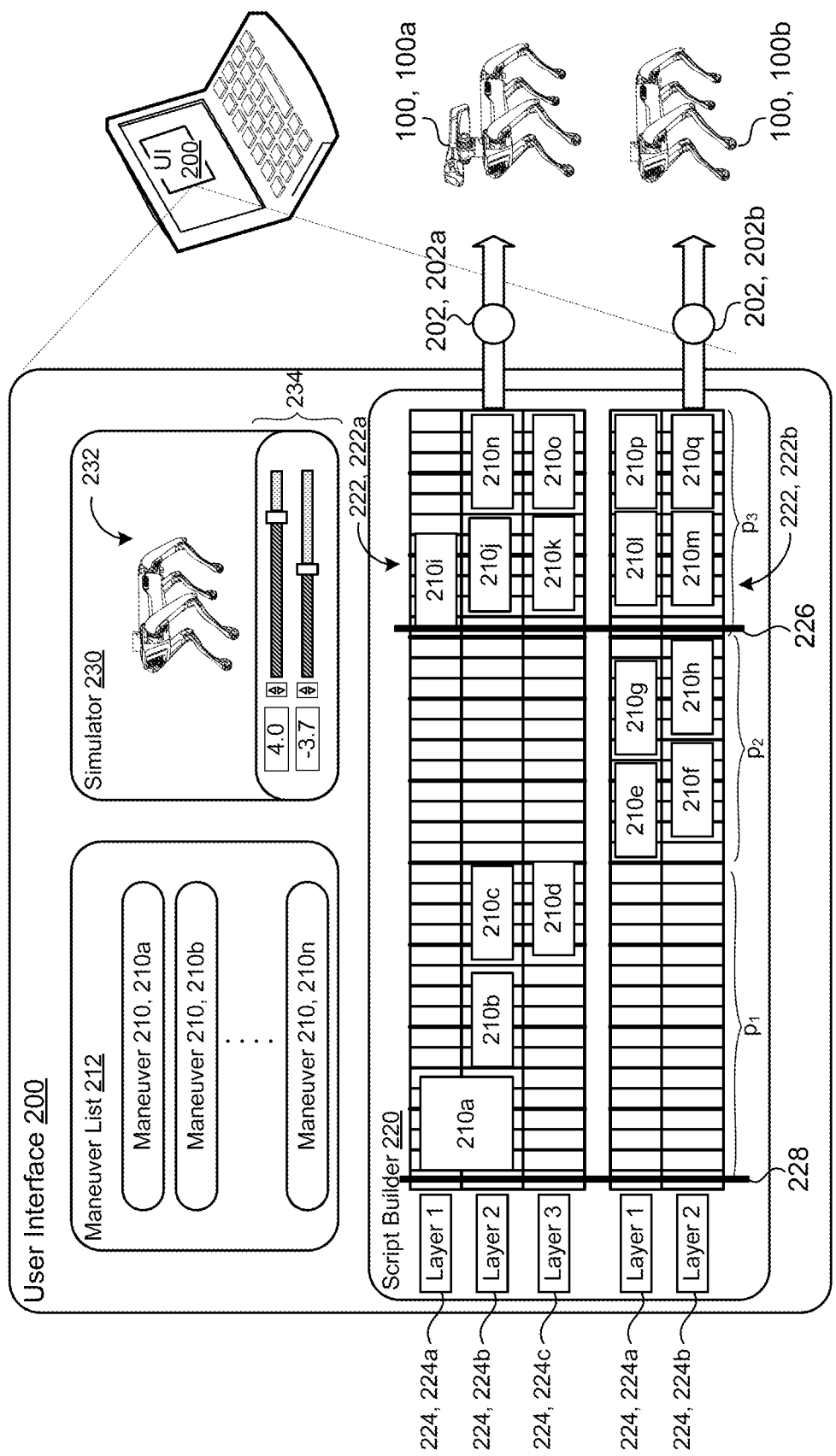

In some examples, such as FIG. 2E, the script builder 220 is scalable for more than one robot 100, 100a-b. For instance, the script builder 220 includes a plurality of timelines 222, 222a-b where each timeline 222 has layers 224 particular to a robot 100. In FIG. 2E, a first timeline 222, 222a is for a first robot 100a and a second timeline 222, 222b is for a second robot 100b. By coordinating timelines 222 for multiple robots 100, the UI 200 may be used to generate coordinated movement routines between robots 100. For instance, the first robot 100a performs a first phase $p_1$ of movement(s), pauses while the second robot 100b then performs a second phase $p_2$ of movement(s), and then the first robot 100a together with the second robot 100b performs a final third phase of movement(s). In some implementations, the UI 200 may be compatible with different types of robots 100 such that types or models of robots 100 may be loaded with a robot profile specific profile. Here, the robot specific profile may load a timeline 222 with a number of layers 224 specific to the robot 100 of the robot specific profile. To illustrate, FIG. 2E depicts the first timeline 222a with three layers 224, 224a-c and the second timeline 222b with only two layers 224, 224a-b. The second timeline 224 has less layers 224 because the corresponding robot 100b does not include an arm 126 and therefore the layer 224 corresponding to joints J of the arm 126 is unnecessary. Although FIG. 2E shows the timelines 222a-b displayed in the same window, each timeline 222 may have its own window (e.g., that the user 10 may toggle between).

Referring back to FIGS. 2A-2E, in some examples, the UI 200 also includes a simulator 230. The simulator 230 may be a panel within a main window of the UI 200 or its own window of the UI 200. In some implementations, the simulator 230 is configured to display a model 232 or an avatar for the robot 100 as a visual simulation for a maneuver 210. For example, the user 10 selects one or more maneuvers 210 and the simulator 230 displays a sample rendition of selected one or more maneuvers 210. In some configurations, such as FIG. 2D, the simulator 230 includes GUI elements 234 that may input or adjust parameters 214 associated with the maneuver 210. In these configurations, the simulator 230 may display the maneuver 210 applying the parameters 214 input by the user 10. For instance, the sliders shown in FIG. 2D as GUI elements 234 for parameters 214 may adjust a tilt or pitch of the body 110 of the robot 100 during a maneuver 210 (e.g., a body maneuver $210_b$). Although FIG. 2D illustrates a single set of parameters 214 for the selection of maneuver 210n, the simulator 230 may be configured to display different GUI elements 234 that correspond to the parameters 214 of the selected maneuver 210. For example, the slider GUI elements 234 may change to simple input fields when the user 10 selects the second maneuver 210b.

In some configurations, the UI 200 is configured to communicate portions of the maneuver script 202 to the robot 100. By communicating portions of the maneuver script 202, the user 10 may troubleshoot or debug subportions of the movement routine. For instance, when a user 10 is frustrated that the maneuver script 202 is failing to execute successfully at the robot 100, the user 10 uses the UI 200 to select a portion of the maneuver script 202 to communicate to the robot 100. In some implementations, the UI 200 requests the robot 100 to perform the maneuver script 202 or portion of the maneuver script 202 in a loop. Here, the user 10 may update the maneuver script 202 at the UI 200 while the robot 100 loops a performance of a maneuver script 202 or portion thereof. In some configurations, the user 10 designates in the timeline 222 where to loop the maneuver script 202. For instance, the user 10 inserts a loop widget 226 (FIGS. 2E and 2F) (e.g., shown as an adjustable vertical bar) into the timeline 222 to designate a position in the maneuver script 202 where the movement routine should repeat (e.g., restart). To illustrate, FIG. 2E shows the loop widget 226 before the third phase $p_3$ of the maneuver scripts 202a-b such that the user 10 may troubleshoot the maneuvers 210, 210i—q of the first phase $p_1$ and the second phase $p_2$.

Additionally, the UI 200 may be configured to save and/or to load maneuver scripts 202 that have been built by the user 10 or are in the process of being built. For instance, the UI 200 communicates with the computing resources 22, 24 of the user device 20 or the computing resources 162 of the remote system 160 to store or to load a particular maneuver script 202. In some examples, the UI 200 allows the user 10 to share a maneuver script 202 with other users such that maneuver scripts 202 may be built in collaboration. In some implementations, the UI 200 includes storage containers (e.g., file directories) that include one or more maneuver scripts 202 or a pointer to a location of one or more maneuver scripts 202. Additionally or alternatively, the computing system 140 of the robot 100 may store maneuver scripts 202 (e.g., temporarily or for some extended period of time).

In some implementations, a maneuver script 202 corresponds to a dance routine where each maneuver 210 is a dance move that the robot 100 may perform. Here, the time slices $t_s$ of the timeline 222 may be used to coordinate with a tempo (i.e., rate) of a particular song. For instance, a song is identified (e.g., by the UI 200) to be a particular number of beats per minute (BPM) and each slice is corresponds to a division of a single beat b. Since the maneuvers 210 are scalable, the tempo of a song may be changed (e.g., sped up or slowed down) or the actual song may be changed and the performance of the maneuver script 202 may be adapted to the changed tempo.

Figure 2F:
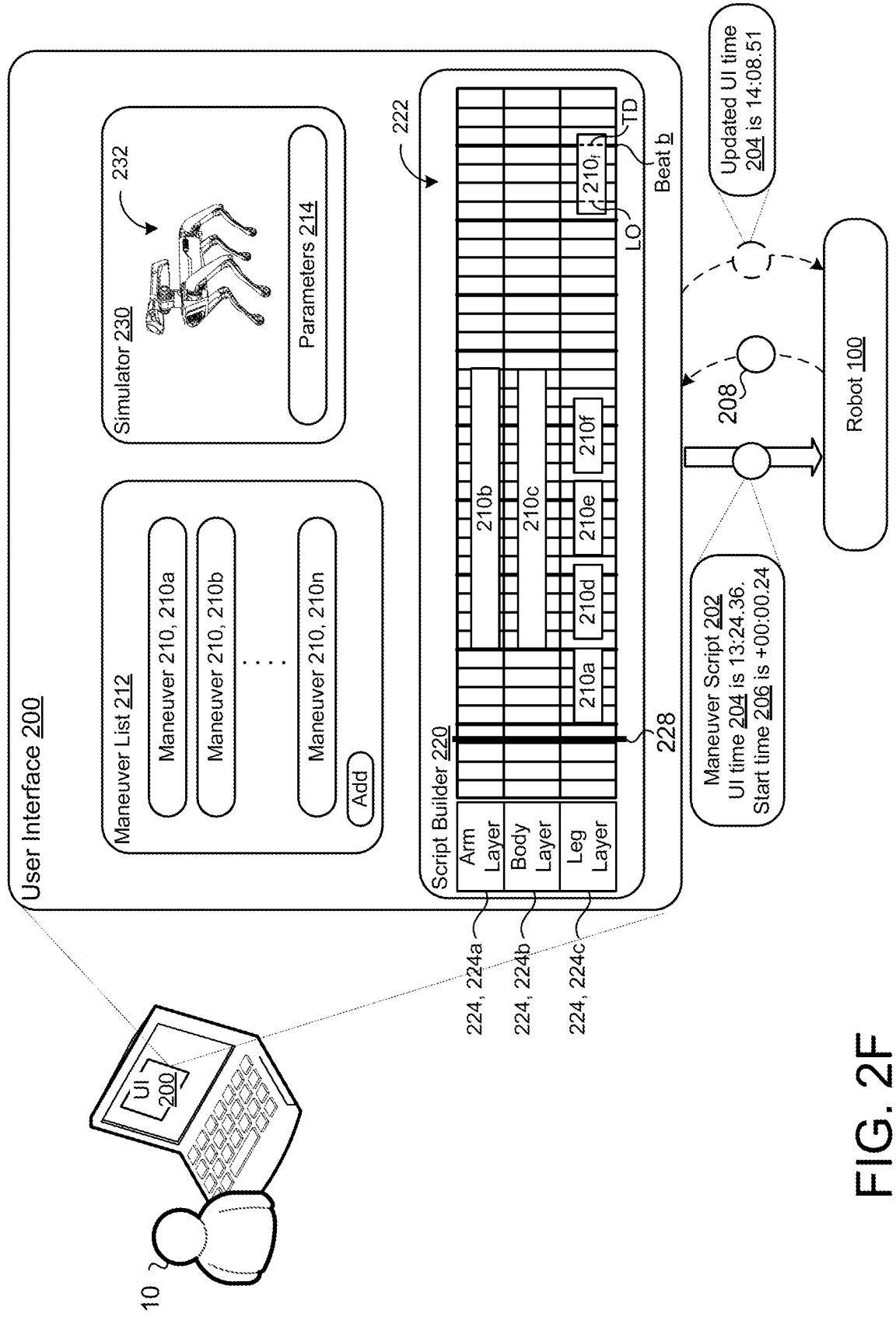

In some implementations, the script builder 220 includes a setting (e.g., a GUI element 234) that sets the timeline 222 to a particular tempo (e.g., BPM) to correspond to a particular song. This setting, for example, may allow the user 10 to directly map a beat b of a song to a maneuver 210 or portions of a maneuver 210. For instance, FIG. 2F depicts that a footstep maneuver $210_f$ indicates a touchdown (TD) and/or a liftoff (LO) position in a block representation of the footstep maneuver $210_f$ on the timeline 222. With this TD/LO indication, the user 10 may align (or misalign on the upbeat) the TD or LO directly with a beat b of a song. For example, in FIGS. 2A-2F, the timeline 222 displays the beat b of a song by a darker bar between slices $t_s$.

In some configurations, the UI 200 (e.g., the script builder 220) includes features to promote synchronization of a maneuver script 202 with audio from a song. In some examples, such as FIG. 2E, the UI 200 includes a slider bar 228 for the timeline 222. The slider bar 228 may be a time-synchronization tool where the user 10 may set the slider bar 228 at a custom position in the timeline 222. The position of the slider bar 228 may be used to indicate a start position where the robot 100 should start performing the movement routine (e.g., the dance) of the maneuver script 202. For example, FIG. 2F depicts the slider bar 228 before the first maneuver 220a.

In some implementations, such as FIG. 2F, the UI 200 sends the robot 100 the maneuver script 202 as a configuration file along with a current system time 204 of the UI 200 (e.g., a time stamp according to a clock of the user device 20) and a start time 206 at which the robot 100 should start the movement routine (e.g., as indicated by the position of the slider bar 228). Here, the robot 100, upon receiving the maneuver script 202 with the system time 204 of the UI 200 and the start time 206 for the movement routine, will wait the amount of time specified by the UI 200 and then begin the movement routine (e.g., start dancing). In some examples, when the robot 100 receives the maneuver script 202, the robot 100 presumes that the communication of the maneuver script 202 between the UI 200 and the robot 100 has taken some amount of communication time and synchronizes its own clock to account for this amount of communication time. For instance, the robot 100 synchronizes its own clock to be the clock time stamp 204 received from the UI 200 plus an additional amount for the communication time. Based on this time synchronization, the robot 100 begins the movement routine (e.g., the dance) at some future time (e.g., at a time in the future equal to a difference between system time 204 of the UI 200 and the designated start time 206).

Additionally or alternatively, the robot 100 provides feedback 208 to the UI 200 as to a time location where the robot 100 perceives it is in the movement routine (e.g., the dance). For instance, the robot 100 provides its own clock time 208, 208a (FIG. 3) (e.g., in the form of a time stamp) as feedback 208. Here, the robot's time should closely resemble the system time 204 of the UI 200 because of previous synchronization when the robot 100 received the maneuver script 202. In some examples, when there is variance between the system time 204 of the UI 200 and the clock time 208a of the robot 100, the UI 200 may resend its system time 204 to the robot 100 to resynchronize. In some implementations, when resynchronization occurs, the robot 100 may be configured to speed up or to slow down maneuvers 210 of the maneuver script 202. For instance, the robot 100 identifies a candidate maneuver 210 that the robot 100 may perform more quickly or more slowly to adjust the maneuver routine 202 with the resynchronization. In yet other examples, instead of feedback 208 from the robot 100, the UI 200 periodically communicates its current time clock 204 (e.g., at some designated frequency) to the robot 100 such that the robot 100 checks for synchronization between the UI 200 and the robot 100. In these examples, the robot 100 performs resynchronization when the periodic communication from the UI 200 indicates a misalignment of time. In some configurations, the robot 100 resynchronizes when the difference between the system time 204 of the UI 200 and the time clock 208a of the robot 100 satisfies a time shift threshold (e.g., exceeds a value set as the time shift threshold). This approach may prevent the robot 100 from frequently resynchronizing when small time shifts exist between the UI 200 and the robot 100.

Figure 3:
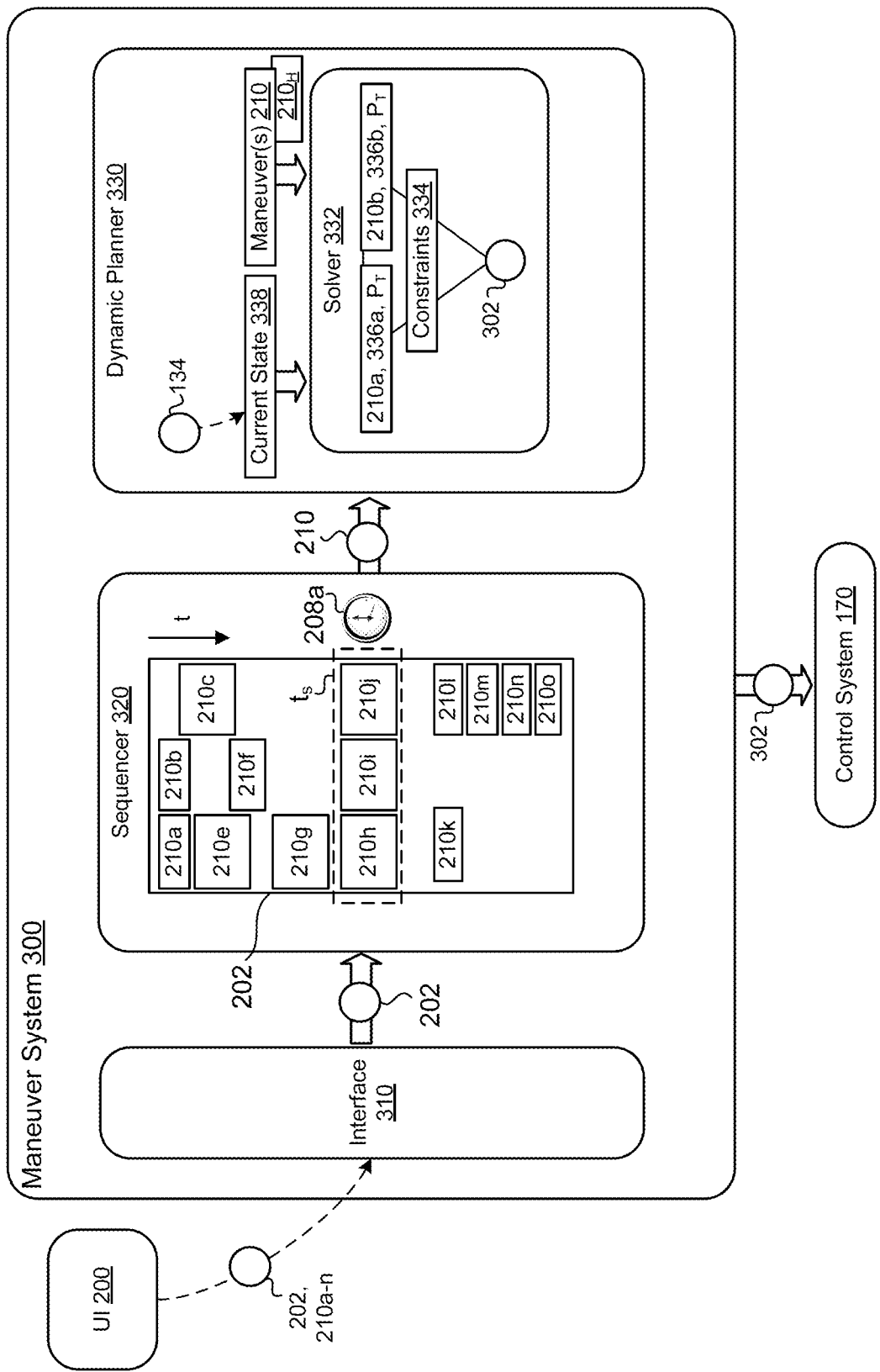
FIG. 3 is a schematic view of an example maneuver system for the robot of FIG. 1A.

Referring to FIG. 3, the maneuver system 300 includes an interface 310, such as an application programming interface (API), a sequencer 320, and a dynamics planner 330. From an overall perspective, the goal of the maneuver system 300 is to receive a motion request (e.g., the maneuver script 202 with maneuver(s) 210) as an input and convert that input to a solution that generates motion for the robot 100. Here, even if the input is impossible (e.g., from a physics or robot dynamics perspective), the maneuver system 300 is configured to return a solution that is a closest possible solution to generate motion for the robot 100 based on the inputs. In other words, the maneuver system 300 is configured to determine the compliance or actual feasibility of the robot 100 to perform the maneuvers 210 of the maneuver script 202. This approach is particularly useful when a combination of maneuvers 210 occur in a maneuver script 202 at a given time instance (i.e., the user 10 has layered maneuvers 210).

In some examples, the interface 310 functions as a means of communication between the UI 200 and the robot 100. In other words, the interface 310 is a way for the entire maneuver script 202 to be communicated from the UI 200 to the robot 100. In some implementations, the sequencer 320 interprets the maneuver script 202 from the interface 310 to understand the time sequence of when the robot 100 should attempt to execute a particular maneuver 210 of the maneuver script 202. In some examples, the sequencer 320 operates as a schedule for the maneuvers 210 of the maneuver script 202. In some configurations, the sequencer 320 operates by identifying the clock time 208a for the robot 100 and identifying the maneuver(s) 210 that should be running at the identified time. For instance, based on the time clock 208a of the robot 100, the sequencer 320 identifies a particular slice $t_s$ of the maneuver script 202 and determines whether the robot 100 should be performing or attempting to perform a maneuver 210 at that time slice $t_s$. When the sequencer 320 identifies that one or more maneuvers 210 are associated with the identified time slice $t_s$, the sequencer 320 may communicate these maneuver(s) 210 to the dynamic planner 330. For instance, FIG. 3 depicts the sequencer 320 with a clock symbol that identifies the current time 208a for the robot 100 and a time slice $t_s$ of the maneuver script 202 that corresponds to the current time 208a. Here, there are three maneuvers 210h-j that occur at that time slice $t_s$ (e.g., shown with a dotted box around the three maneuvers 210h-j).

The maneuver system 300 is configured to generate commands 302 to control motion of the robot 100 to move or to attempt to move based on the maneuver(s) 210 of the maneuver script 202. The maneuver system 300 may use the dynamic planner 330 to generate all of or a portion of the commands 302. In some examples, the dynamic planner 330 is configured to generate commands 302 for joints J of the robot 100 in order to control the robot's motion (also referred to as joint commands 302). Here, the joint commands 302 may correspond to joint positions, joint forces (e.g., joint torques), joint angles, angular velocities related to joints J, etc. Controllers 172 use the dynamic planner 330 as a utility when the controllers 172 are activated by a maneuver 210 at a particular instance of time to determine the joint commands 302 (e.g., joint torques) to achieve or to attempt to achieve the movement of the maneuver(s) 210. In examples where the robot 100 is a legged robot (e.g., a quadruped), the dynamic planner 330 is often used to coordinate leg maneuvers 210 since leg movement is a common type of control for a legged robot 100 (e.g., often layered together). With a legged robot 100, the control system 170 may control stance leg(s) $120_{ST}$ with force control (e.g., joint torque) and swing leg(s) $120_{SW}$ by position (e.g., with joint angles and angular velocities).

In order to generate joint commands 302, the dynamic planner 330 includes a solver 332. Here, the solver 332 refers to an optimization model that incorporates various constraints 334 for the robot 100 and/or the surroundings of the robot 100 (e.g., structural constraints, physical-world constraints, user-defined constraints, etc.). In order to coordinate movement, the solver 332 of the dynamic planner 330 may receive or be preprogrammed to satisfy these constraints 334 such that the robot 100 can continue functionality (e.g., maintain its balance) while performing requested movements (e.g., requested through the maneuver script 202). Some more specific examples of constraints 334 include range of motion constraints for the robot 100, constraints based on structural dimensions of the robot 100 (e.g., leg lengths), estimates of friction on the robot 100 (e.g., at the feet 124 of the robot 100), etc.

To generate joint commands 302, the dynamic planner 330 receives information, such as the parameters 214, regarding one or more maneuvers 210 from the maneuver script 202. In some examples, the dynamic planner 330 identifies a cost 336 associated with a maneuver 210 (e.g., with each maneuver 210 received at the dynamic planner 330). Here, the cost 336 refers to a value which designates the importance for the movement or a particular portion of the movement of a maneuver 210. For instance, the cost 336 corresponds to an importance of a target event pose PT for the maneuver 210. The target event pose PT generally refers to a desired body position or orientation for a given movement. In some implementations, each maneuver 210 received by the dynamic planner 330 includes a cost 336. Here, as shown in FIG. 2A, the user 10 may define the cost 336 as a parameter 214 when the building the maneuver script 202. In other words, the user 10 defines how critical a particular movement of a maneuver 210 is by assigning a value to the target event pose PT for the maneuver 210.

By having costs 336 associated with maneuvers 210 that are input into the solver 332, the solver 332 is configured to optimize multiple costs 336 to understand how to best to perform more than one maneuver 210 at a particular instance of time in the maneuver script 202. In other words, when a first maneuver 210a and a second maneuver 210b occur at the same time instance, each maneuver 210a-b includes a cost 336, 336a-b that informs the solver 332 what is important (e.g., to the user 10) about each maneuver 210a-b. For instance, the first maneuver 210a is a footstep maneuver 210f where the user really wants to achieve a particular touchdown position for the foot 124 during the footstep (e.g., during swing), but does not care (or value) the movement speed during the footstep or the orientation of the foot 124 during the footstep maneuver 210f. Here, the user 10 may set the cost 336 of the touchdown position for the footstep maneuver 210f to reflect such high importance (e.g., a large cost value). In this example, when the user 10 layers an additional maneuver 210, such as the body maneuver 210b of sway, as a second maneuver 210b, the solver 332 may decide to reduce the amount of sway for this second maneuver 210b so that it does not compromise the accuracy of the touchdown position for the first maneuver 210a. Here, the amount of sway may have been designed as a parameter 214 at the UI 200. In this scenario, the second maneuver 210b may be configured with a cost 336b that reflects a lower importance for the amount of sway. In this example, when each maneuver 210a-b has a high cost 336 that poses a potential conflict, the solver 332 may try to optimize the movement result to resolve the conflict or compromise between the conflicting commands.

In some configurations, maneuvers 210 that are hints $210_H$ are resolved prior to the dynamic planner 330. In other words, the maneuver system 300 and/or the control system 170 determines whether the hint $210_H$ is compatible with other maneuvers 210 that occur at a same time instance. In these configurations, when a hint $210_H$ is compatible with maneuver(s) 210 occurring at the same time as the hint $210_H$, the maneuver(s) 210 are modified to incorporate the movements of the hint $210_H$ or the parameters 214 of the hint $210_H$. Based on this process, the dynamic planner 330 may receive a maneuver 210 already modified by a hint $210_H$ at the solver 332.

In some examples, a controller 172 of the robot 100 executes a maneuver 210 without utilizing the dynamic planner 330. In other words, the solver 332 that generates the joint commands 302 is not necessary for particular maneuvers 210. For example, particular maneuvers 210 do not pose a joint control conflict. In other words, when an arm maneuver $210_a$, which only affects the joints J of the arm 126, and a leg maneuver $210_l$, which does not impact the joints J of the arm 126, occur at a same time instance, the controller 172 operating the arm maneuver $210_a$ may proceed in its own joint commands 302 for the arm 126 without utilizing the dynamic planner 330. In some examples, maneuvers 210 bypass the dynamic planner 330 when optimization is not necessary (e.g., when only one maneuver 210 occurs without the potential of joint interference during execution of the movement(s) for that maneuver 210). In some implementations, the maneuver system 300 is configured to not allow maneuvers 210 to bypass the dynamic planner 330, even for basic maneuvers 210. In this approach, using the dynamic planner 330 even for basic maneuvers 210 will help ensure the robot 100 obeys real-world constraints (e.g., constraints 334) during movement for the maneuver 210. This approach also enables the robot 100 to maintain balance and motion fluidity during movement.

While not all maneuvers 210 necessarily utilize the dynamic planner 330, in some implementations, bypassing the dynamic planner 330 is not predicated on the controller(s) 172 using disjoint sets of joints J. Instead, in some examples, the maneuver system 300 may use tracks (or "layers") to avoid situations of multiple controllers 172 attempting to command the same joints J. In some instances, many, but not all, controllers 172 are implemented using the dynamic planner 330. The dynamic planner 330 incorporates hints $210_H$ to avoid resolving multiple controllers 172 that want to command the same joints J.

In some implementations, a maneuver 210 is either a controller 172 or a hint $210_H$. Optionally, the maneuver 210 can be both a controller 172 and a hint $210_H$. Controllers 172 directly control joints J of the robot 100. In the examples shown, hints $210_H$ are received by the controllers 172 as requests to modify the behavior of the respective controllers 172 in a specific way. Dance moves (e.g., maneuvers 210) are assigned to one or more tracks (layers 224). Which track(s) a dance move goes on is an inherent property of the type of that individual dance move, not something the user 10 selects. For example, a "Step" move may always goes on a legs track and a "Sway" move may always goes on a body track. Tracks define whether their dance moves are hints $210_H$ or controllers 172. In some instances, all leg and arm moves are controllers 172 and all body moves are hints $210_H$. If a dance move uses multiple tracks, it is a controller 172 if any of them are controller tracks. The dynamic planner 330 is a utility used by many of the leg-track controllers. It knows how to incorporate hints $210_H$ to modify its behavior.

In some implementations, to generate joint commands 302 for joints J of the robot 100, the maneuver system 300 accounts for a current state 338 of the robot 100. Here, the current state 338 of the robot 100 may refer to anything that is measured related to the robot 100 or the surroundings of the robot 100. For instance, the current state 338 includes sensor data 134 from the sensor system 130 about the time when the robot 100 is attempting to perform a maneuver 210 (e.g., the time identified by the sequencer 320). Some examples of the current state 338 include the position of the robot 100, the velocity of the robot 100, and/or the forces that the robot 100 is experiencing. When the maneuver system 300 accounts for the current state 338, the maneuver system 300 (e.g., the dynamic planner 330) may update constraints 334 based on the current state 338 to enable accurate optimization for the solver 332.

Figure 4:
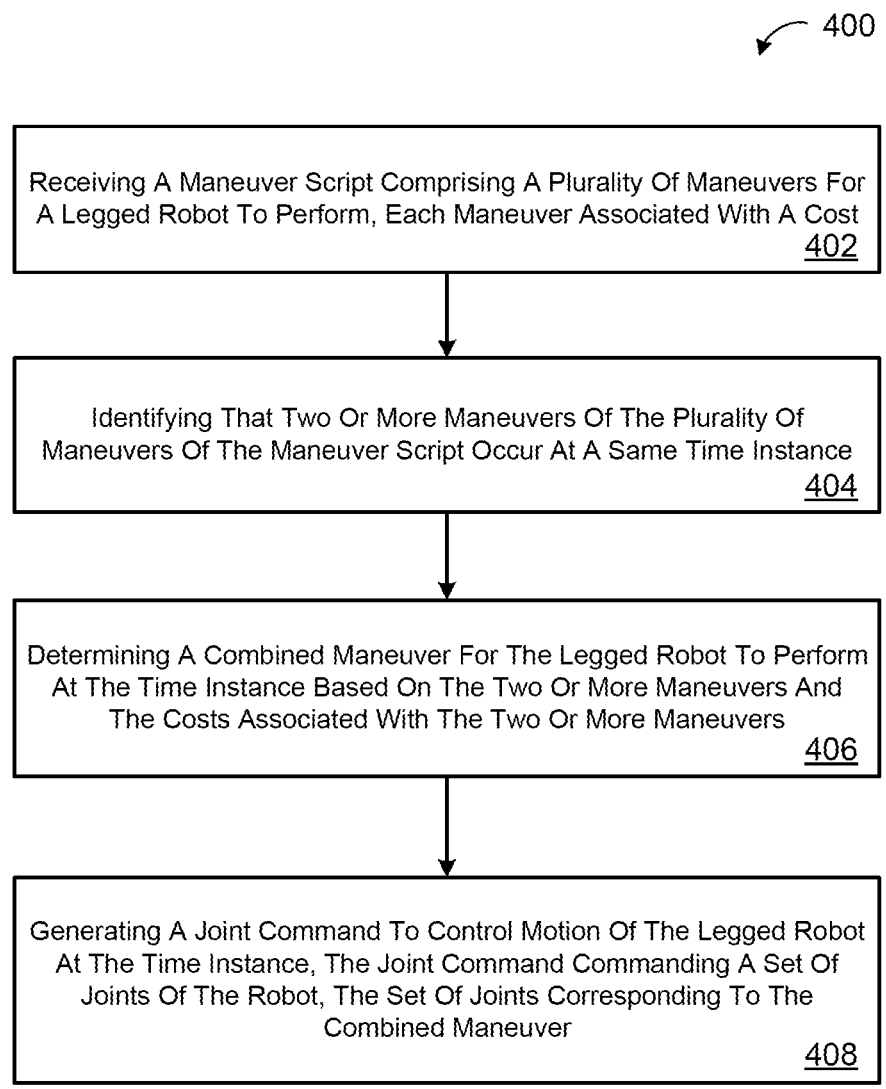
FIG. 4 is an example arrangement of operations for a robot to perform maneuvers.

FIG. 4 is an example arrangement of operations for a method 400 that generates a command to control motion of the robot 100. At operation 402, the method 400 receives a maneuver script 202 including a plurality of maneuvers 210 for a legged robot 100 to perform. Here, each maneuver 210 is associated with a cost 336. At operation 404, the method 400 identifies that two or more maneuvers 210 of the plurality of maneuvers 210 of the maneuver script 202 occur at the same time instance. At operation 406, the method 400 determines a combined maneuver for the legged robot 100 to perform at the time instance based on the two or more maneuvers 210 and the costs 336 associated with the two or more maneuvers 210. At operation 408, the method 400 generates a joint command 302 to control motion of the legged robot 100 at the time instance, the joint command 302 commanding a set of joints J of the legged robot 100. Here, the set of joints J correspond to the combined maneuver.

In some examples, the plurality of maneuvers 210 include a hint that corresponds to a body movement for a body 110 of the legged robot 100. Here, the method 400 determines whether the hint is compatible with another maneuver 210 of the plurality of maneuvers 210 occurring at a same instance of time as the hint and modifies the other maneuver 210 to incorporate the body movement of the hint when the hint is compatible with the other maneuver 210. In some implementations, receiving the maneuver script 202 includes receiving the maneuver script 202 from a user device 20 in communication with the data processing hardware. Here, the maneuver script 202 is defined by a user 10 of the user device 20 at a user interface 200 executing on the user device 20. In some configurations, the method 400 synchronizes each dance move of the dance script with a beat of a song when the maneuver script 202 includes a dance script and each maneuver 210 includes a dance move.

Figure 5:
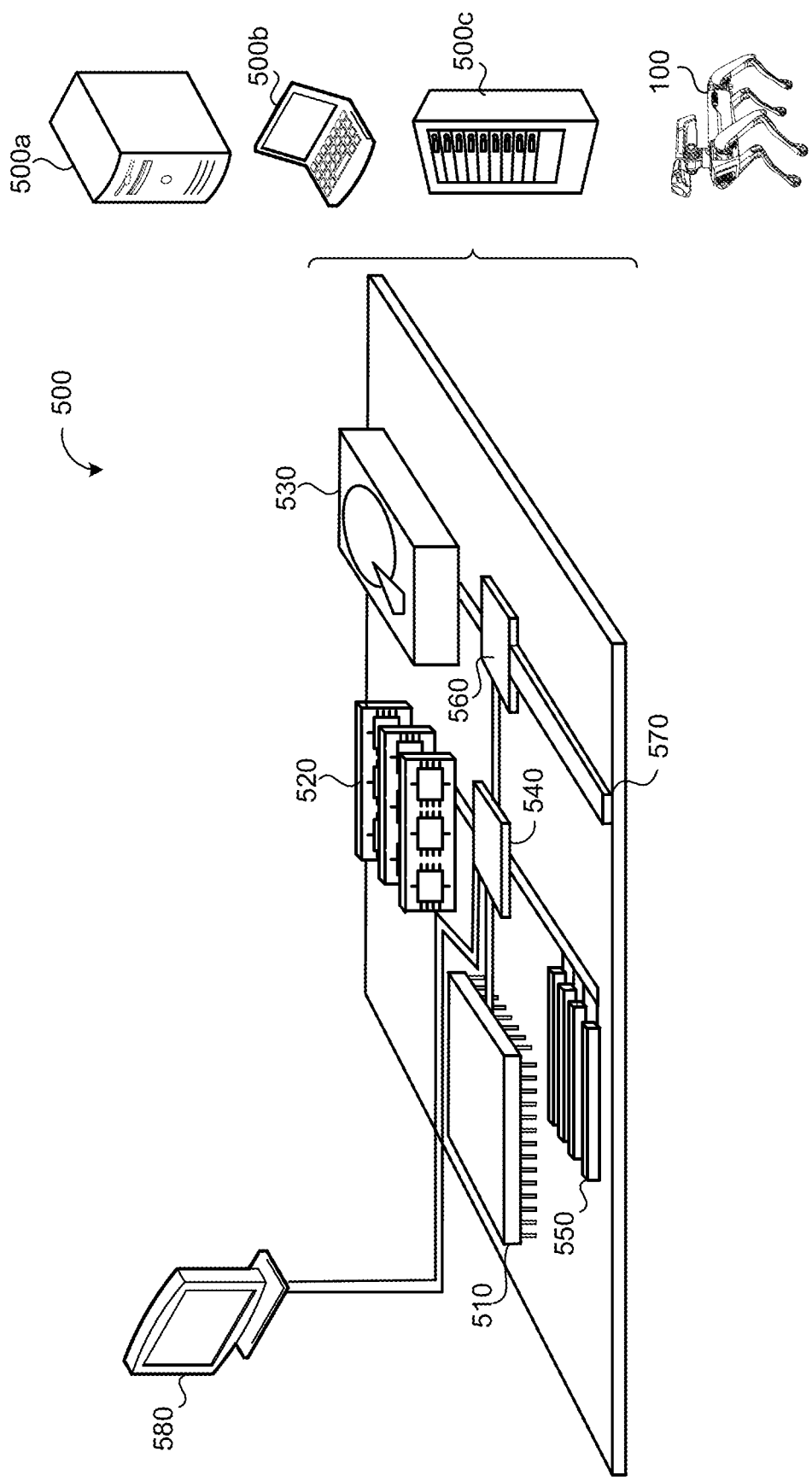
FIG. 5 is a schematic view of an example computing device that may be used to implement the systems and methods described herein.

FIG. 5 is schematic view of an example computing device 500 that may be used to implement the systems (e.g., the UI 200 and/or the maneuver system 300) and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, as part of a rack server system 500c, or as part of the robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A robot comprising:
    a body;
    two or more legs coupled to the body, a first leg of the two or more legs comprising a first joint;
    one or more sensors configured to generate sensor data;
    data processing hardware; and
    memory hardware having stored thereon instructions that, when executed by the data processing hardware, cause the data processing hardware to:
        receive a maneuver script comprising a first maneuver and a second maneuver for the robot to perform,
        determine that a first maneuver and a second maneuver both command the first joint at a same time,
        determine a combined maneuver for the robot to perform based on the first maneuver and the second maneuver,
        determine a current state of the robot based on the sensor data, and
        generate a joint command to control motion of the robot based on the current state of the robot and the combined maneuver.

2. The robot of claim 1, wherein the instructions, when executed by the data processing hardware, further cause the data processing hardware to:
    determine one or more constraints based on the current state of the robot,
    wherein the generating of the joint command is further based on the one or more constraints.

3. The robot of claim 2, wherein the one or more constraints comprise at least one of: a range of motion for the robot, one or more structural dimensions of the robot, or an estimate of friction of the robot.

4. The robot of claim 1, wherein:
    each of the first maneuver and the second maneuver is associated with a cost, and
    the determining of the combined maneuver is further based on the costs associated with the first maneuver and the second maneuver.

5. The robot of claim 1, further comprising:
    an interface configured to receive the maneuver script from an external user interface and provide the received maneuver script to the data processing hardware.

6. The robot of claim 1, wherein the instructions, when executed by the data processing hardware, further cause the data processing hardware to:
    obtain a current clock time; and
    identify the first maneuver and the second maneuver to be run by the robot at a particular time slice based on the current clock time.

7. The robot of claim 1, wherein:
    the maneuver script further comprises a hint maneuver that commands the first joint at the same time as the first maneuver and the second maneuver, and
    the instructions, when executed by the data processing hardware, further cause the data processing hardware to:
        determine that the hint maneuver is compatible with the second maneuver, and
        modify the second maneuver to incorporate the body movement of the hint,
    the determining of the combined maneuver is further based on the modified second maneuver.

8. The robot of claim 1, wherein:
    the maneuver script further comprises a third maneuver that commands the first joint at a different time from the first maneuver and the second maneuver, and
    the instructions, when executed by the data processing hardware, further cause the data processing hardware to:
        determine that the third maneuver does not conflict with any other maneuvers, and
        bypass determining a second combined maneuver for the robot to perform based on the third maneuver in response to determining that the third maneuver does not conflict with any other maneuvers.

9. The robot of claim 1, wherein:
the sensor data comprises environment data indicative of an environment of the robot and pose data indicative of a pose of the robot, and
the determining of the current state of the robot is further based on the environment data and the pose data.

10. A method, comprising:
receiving, at data processing hardware, a maneuver script comprising a first maneuver and a second maneuver for a robot to perform, the robot comprising the data processing hardware, a body, two or more legs coupled to the body, and one or more sensors configured to generate sensor data, a first leg of the two or more legs comprising a first joint;
determining that a first maneuver and a second maneuver both command the first joint at a same time;
determining a combined maneuver for the robot to perform based on the first maneuver and the second maneuver;
determining a current state of the robot based on the sensor data; and
generating a joint command to control motion of the robot based on the current state of the robot and the combined maneuver.

11. The method of claim 10, further comprising:
determining one or more constraints based on the current state of the robot,
wherein the generating of the joint command is further based on the one or more constraints.

12. The method of claim 11, wherein the one or more constraints comprise at least one of: a range of motion for the robot, one or more structural dimensions of the robot, or an estimate of friction of the robot.

13. The method of claim 10, wherein:
each of the first maneuver and the second maneuver is associated with a cost, and
the determining of the combined maneuver is further based on the costs associated with the first maneuver and the second maneuver.

14. The method of claim 10, further comprising:
receiving the maneuver script from an external user interface via an interface of the robot; and
providing the received maneuver script to the data processing hardware.

15. The method of claim 10, further comprising:
obtaining a current clock time; and
identifying the first maneuver and the second maneuver to be run by the robot at a particular time slice based on the current clock time.

16. The method of claim 10, wherein:
the maneuver script further comprises a hint maneuver that commands the first joint at the same time as the first maneuver and the second maneuver, and
the method further comprises:
determining that the hint maneuver is compatible with the second maneuver; and
modifying the second maneuver to incorporate the body movement of the hint,
the determining of the combined maneuver is further based on the modified second maneuver.

17. A non-transitory computer-readable medium having stored thereon instructions that, when executed by data processing hardware, cause the data processing hardware to:
receive, at data processing hardware, a maneuver script comprising a first maneuver and a second maneuver for a robot to perform, the robot comprising the data processing hardware, a body, two or more legs coupled to the body, and one or more sensors configured to generate sensor data, a first leg of the two or more legs comprising a first joint;
determine that a first maneuver and a second maneuver both command the first joint at the same time;
determine a combined maneuver for the robot to perform based on the first maneuver and the second maneuver;
determine a current state of the robot based on the sensor data; and
generate a joint command to control motion of the robot based on the current state of the robot and the combined maneuver.

18. The non-transitory computer-readable medium of claim 17, wherein the instructions, when executed by data processing hardware, further cause the data processing hardware to:
determine one or more constraints based on the current state of the robot,
wherein the generating of the joint command is further based on the one or more constraints.

19. The non-transitory computer-readable medium of claim 18, wherein the one or more constraints comprise at least one of: a range of motion for the robot, one or more structural dimensions of the robot, or an estimate of friction of the robot.

20. The non-transitory computer-readable medium of claim 17, wherein:
each of the first maneuver and the second maneuver is associated with a cost, and
the determining of the combined maneuver is further based on the costs associated with the first maneuver and the second maneuver.

* * * * *